United States Patent [19]
Ramm

[11] Patent Number: 5,261,296
[45] Date of Patent: Nov. 16, 1993

[54] METHOD FOR CONTROLLING SHIFTING PARAMETERS IN AN AUTOMATIC TRANSMISSION

[75] Inventor: Norbert Ramm, Braunschweig, Fed. Rep. of Germany

[73] Assignee: Volkswagen AG, Postfach, Fed. Rep. of Germany

[21] Appl. No.: 913,147

[22] Filed: Jul. 14, 1992

[30] Foreign Application Priority Data

Aug. 10, 1991 [DE] Fed. Rep. of Germany ....... 4126571

[51] Int. Cl.$^5$ ...................... F16H 59/36; B60K 41/06
[52] U.S. Cl. .......................................... 74/856; 74/858; 364/424.1
[58] Field of Search ................ 74/858, 866, 856; 364/424.1

[56] References Cited

U.S. PATENT DOCUMENTS

| | | | |
|---|---|---|---|
| 4,360,092 | 11/1982 | Müller et al. | 192/12 C |
| 4,370,903 | 2/1983 | Stroh et al. | 74/858 |
| 4,724,723 | 2/1988 | Lockhart et al. | 74/858 X |
| 4,933,851 | 6/1990 | Ito et al. | 74/858 X |
| 5,046,383 | 9/1991 | Butts et al. | 74/866 X |
| 5,094,125 | 3/1992 | Bota | 74/858 |
| 5,129,286 | 7/1992 | Nitz et al. | 74/858 |
| 5,133,227 | 7/1992 | Iwatsuki | 74/858 X |

FOREIGN PATENT DOCUMENTS 2333099 1/1975 Fed. Rep. of Germany .
2913824 10/1980 Fed. Rep. of Germany .

Primary Examiner—Leslie A. Braun
Assistant Examiner—Khoi Q. Ta
Attorney, Agent, or Firm—Brumbaugh, Graves, Donohue & Raymond

[57] ABSTRACT

The specification discloses a method for controlling shifting parameters of an automatic transmission having a planetary gear arrangement including a sun gear, planet gears and a ring gear, where the mechanical linkage of any two of these components represents a mechanical gear ratio. To obtain exact control of shifting, the speed variations of the sun gear are measured and these measured values are used for precise determination of the coupling point or of the duration of shifting and/or for engine management.

5 Claims, 3 Drawing Sheets

METHOD FOR CONTROLLING SHIFTING PARAMETERS IN AN AUTOMATIC TRANSMISSION

BACKGROUND OF THE INVENTION

This invention relates to methods for controlling shifting parameters of automatic transmissions which have a planetary gear arrangement with a sun gear, planet gear and a ring gear, in which the mechanical linkage of each set of two of the planetary gear components represents a mechanical gear ratio.

In automatic transmissions, engine power is generally transmitted hydraulically by way of a converter to the input side of the transmission. As a result, the engine speed and the transmission input speed differ, depending on the characteristics of the converter, in accordance with load and road resistance. Consequently, if the individual shifting parameters of the transmission are controlled according to the engine speed, difficulties are encountered in accomplishing the shift sequence in the transmission.

During a change of gears in an automatic transmission, variations of transmitted drive moment take place which greatly affect comfort during shifting. Such variations are caused by, among other things, engine speed variations (speed jump) and the total inertia of the transmission input components.

SUMMARY OF THE INVENTION

Accordingly, it is an object of the present invention to provide a method for controlling the shifting parameters of an automatic transmission having a planetary gear arrangement which overcomes the above-mentioned disadvantages of the prior art.

Another object of the invention is to provide a method for controlling the shifting parameters of such an automatic transmission which provides more precise control of the parameters.

These and other objects are attained by measuring the speed and variation in speed of the sun gear of the planetary gear arrangement and determining the transmission coupling point or duration of shifting and/or controlling the engine operation based on those measurements.

In the planetary gear arrangement of an automatic transmission, the speed of the sun gear varies from zero to the transmission input speed or vice versa according to the gear selection. As a result, even when speed variations are fairly small, distinctly better gear release is possible based on sun gear speed than when the engine speed or the transmission input speed is used. According to the invention, this higher-quality release is utilized to achieve precise control of the gear-shifting parameters.

To control a gear change in an automatic transmission, a controlling computer requires exact information as to when a shift in the transmission is mechanically completed. If the only available speed information is the engine speed, a significant delay must be provided at the end of shifting in order to make certain that a new shift is not started during a shift that has not yet been completed. If the transmission input speed is available, the problem can be reduced, but the utilization of sun gear speed according to the invention provides a considerable advantage in comparison with the use of transmission input speed.

As soon as the transmission control computer is instructed to carry out an upshift, the new transmission coupling is acted on by hydraulic fluid, for example, through an electrohydraulic valve. This causes the frictional engagement of the coupling to be increased until it is sufficient to accommodate to the new speed.

In this connection, it is advantageous for the determination of the exact coupling point to determine the commencement of shifting by measuring the speed variation of the sun gear upon the commencement of the transition from the old transmission gear to the new transmission gear and comparing the measured sun gear values with a predetermined ideal speed difference characterizing the commencement of shifting.

The computer normally recognizes the commencement of the transition from the old gear to the new gear by a decrease in engine speed or in the transmission input speed. If this decrease in speed exceeds a predetermined ideal value, the commencement of shifting is recognized with certainty. If, on the other hand, the speed of the sun gear is evaluated during the same gear change, the commencement of shifting can be recognized sooner. The end of shifting is determined when the transmission input speed and the transmission gear ratio produce the transmission drive speed. If the computer evaluates the sun gear speed, the coupling point can be determined more exactly because of the fairly large difference in the sun gear speed at that time. As soon as the end of mechanical shifting is recognized by the computer, another shift may, if necessary, be initiated. The delay which must be provided when the end of shifting is detected by a variation in engine speed is unnecessary. The spontaneity of the shifting sequence is thereby improved.

For more exact control of engine operation, i.e., the reduction of power during change of gears, it is advantageous to retard the ignition time upon the commencement of shifting based upon the variation in the speed of the sun gear.

This power cutback during a change of gears reduces fluctuations of drive moment and decreases the work required by the couplings during shifting. The exact control of this power reduction is therefore of paramount importance for comfort and for the service life of an automatic transmission.

In this connection, it is advantageous to reduce power by retarding ignition during shifting according to the invention. Since the rotational energy is simultaneously decreased, the drive moment is not reduced below the moment existing before the ignition time was retarded.

The time for terminating the control of the engine at the end of shifting must be determined very exactly by the control device. The reduction of engine power must be terminated at the engagement point, since otherwise a noticeable upshift jerk will occur.

For this purpose, it is advantageous that, when the increase in the speed of the sun gear and the transmission drive speed are measured during shifting operations in which the sun gear speed is accelerated from zero to the transmission input speed and the new target speed for the sun gear at the end of shifting is determined from those measured values, and when the instantaneous sun gear speed departs from a predetermined differential value with respect to the transmission input speed, the ignition time is changed smoothly to a new value corresponding to the operating point in the characteristic diagram of the engine.

This way of calculating the target speed is necessary only for shifts in which the sun gear speed is accelerated from zero to the transmission input speed. In all other shifts the sun gear target speed is always zero.

The use of sun gear speed thus also permits improved engine control. More precise determination of the commencement of shifting reduces gearshift jerk and heat stress on the shift elements.

The duration of the shifting sequence in automatic transmissions having the same structural design depends upon the power to be shifted and the pressure upon the shifting coupling. In all structurally similar transmissions, this shifting time should be independent of variations in hydraulic transmission control, transmission manufacture, coupling friction linings and the state of wear. If, in addition, the engine power fluctuates, for example, because of manufacturing tolerances, the effect of grades or the like, additional variations in shift time are produced.

The measurement of sun gear speeds according to the invention permits more precise determination of the duration of shifting. In this connection, it is advantageous when the speed of the sun gear is measured during shifting to determine the speed gradient at discrete intervals of time and compare it with a load-dependent ideal differential value, and, upon deviation from that value, to vary correspondingly the pressure at which shifting takes place in order to control the shifting time. If the speed gradient is too small and consequently the shifting takes too long, the hydraulic shift pressure is increased. On the other hand, the hydraulic shift pressure is reduced when the speed gradient is to great.

When the sun gear reaches the target speed, i.e., the transmission input speed at the end of shifting, the shift change is mechanically completed.

The method according to the invention permits comfort to be maintained during shifting over the entire range of transmission operation. Thus, any effects due to variations in parts tolerances, pressure fluctuations and variations in engine power are compensated.

The time at which the foregoing shift measurement determinations are considered in the transmission control program results in an adaptive control wherein the result of the measurement is only considered as a determined value upon the next shift operation, or as an adjustment wherein the result of the measurement affects the concurrent shift operation. The adaptive control is effective for slow variations of all parameters affecting shifting, but the control system can react more rapidly to variations for control elements which respond quickly.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
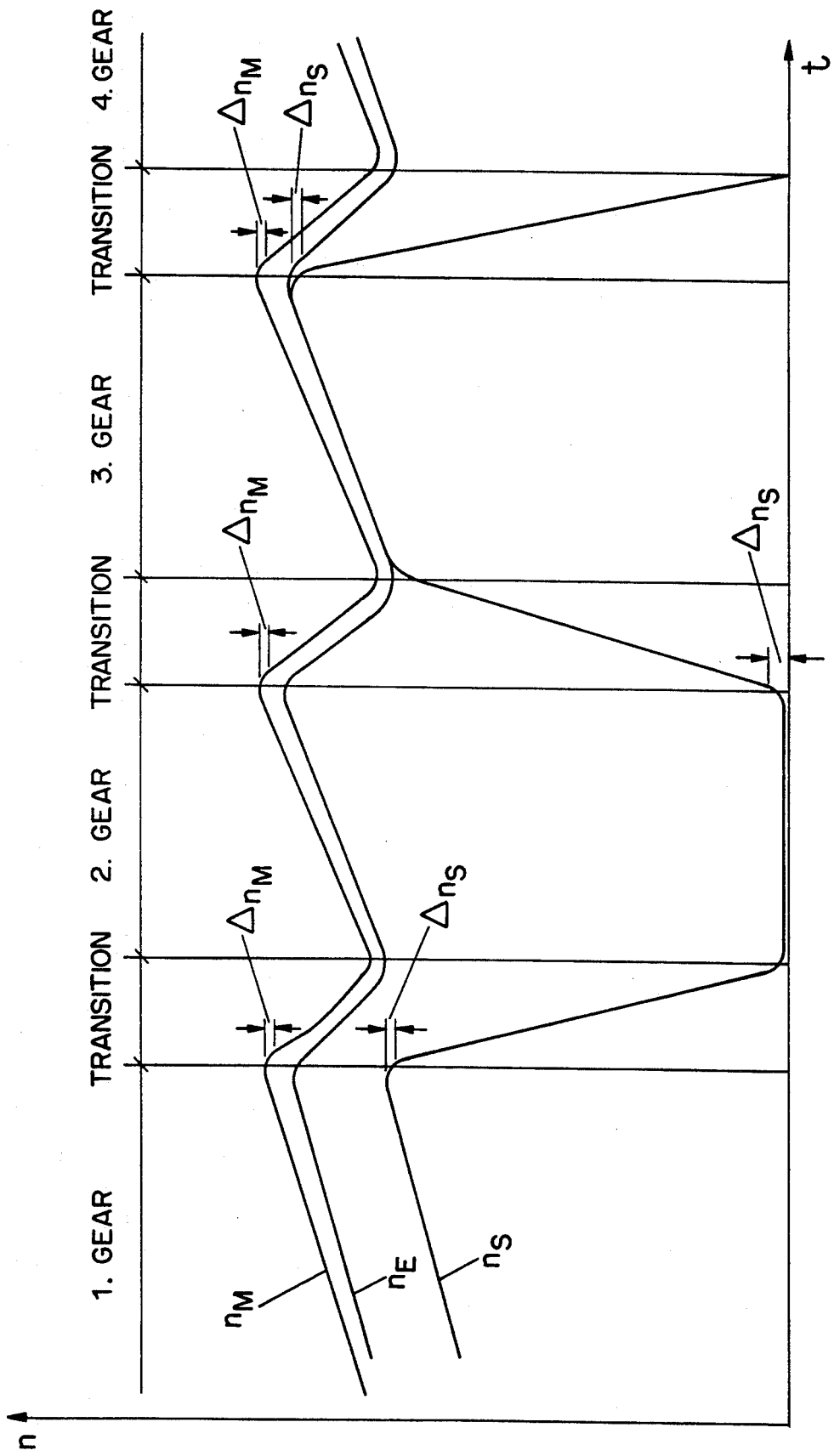
FIG. 1 is a graphical representation showing the variation in engine, transmission input and sun gear speeds during shifting from the first gear to the fourth gear.

FIG. 1 of the drawings shows the curves for engine speed, transmission input speed and sun gear speed over the four speed ranges and the transitional ranges lying between them during the operation of a transmission having a planetary gear arrangement. The following designations are used:

n = speed
t = time
$n_M$ = engine speed
$n_S$ = sun gear speed
$n_E$ = transmission input speed This illustration demonstrates that, at release, the speed of the sun gear is greater than that of the transmission input, i.e., the turbine speed.

If the drop in speed of any of these components exceeds a predetermined ideal value, the commencement of a shifting operation is recognized with certainty. If the speed of the sun gear is evaluated for this purpose, it is apparent from that earlier recognition of the commencement of shifting is possible. If the computer uses the sun gear speed $n_S$, the coupling point can be determined more exactly because of the greater change in the sun gear speed.

Figure 2:
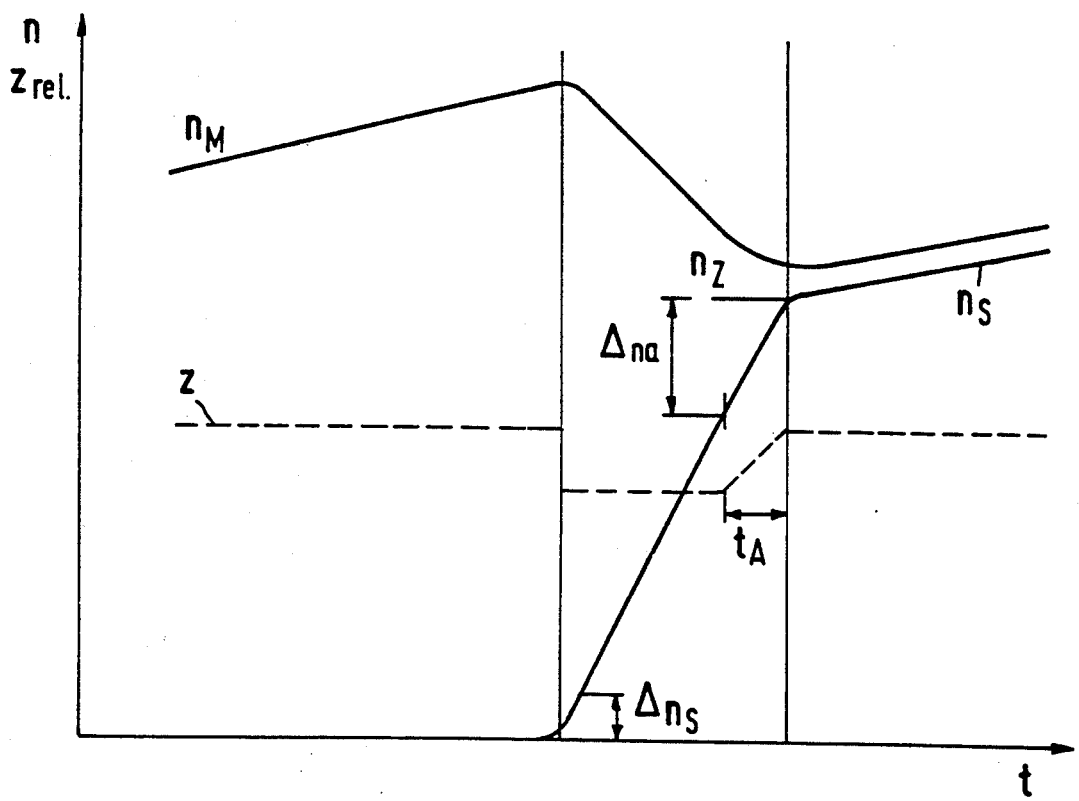
FIG. 2 is a graphical representation showing the control of engine operation upon shifting from second gear to third gear.

FIG. 2 shows the transition from second gear to third gear as an example of engine control using the sun gear speed. The following additional designations are employed:

$z_{rel.}$ = relative ignition time
Z = ignition time
$n_Z$ = target speed of sun gear
$t_A$ = upshift time
$\Delta n_a$ = predetermined differential value At the start of shifting from second gear to third gear, the computer recognizes the commencement of shifting when the speed difference $\Delta n_S$ of the sun gear is exceeded and initiates ignition retardation. The resulting decrease in power continues during shifting.

In addition, during the speed increase of the sun gear, the computer computes a new target speed $n_Z$ that the sun gear speed $n_S$ will have at the end of the shifting operation. As soon as the instantaneous sun gear speed $n_s$ differs from this target sun gear speed $n_Z$ by a predetermined differential value $\Delta n_a$, the ignition time $n_Z$ is brought smoothly to the ignition time value prior to shifting during a selected upshift time $t_A$.

This way of computing the target speed $n_Z$ is only necessary in shifts in which the sun gear speed $n_X$ is accelerated from zero to the transmission input speed $n_E$, which, according to FIG. 1, is the case only upon upshift from second to third gear. Upon upshift from first to second gear or from third to fourth gear, the target speed $n_Z$ is always zero.

Figure 3:
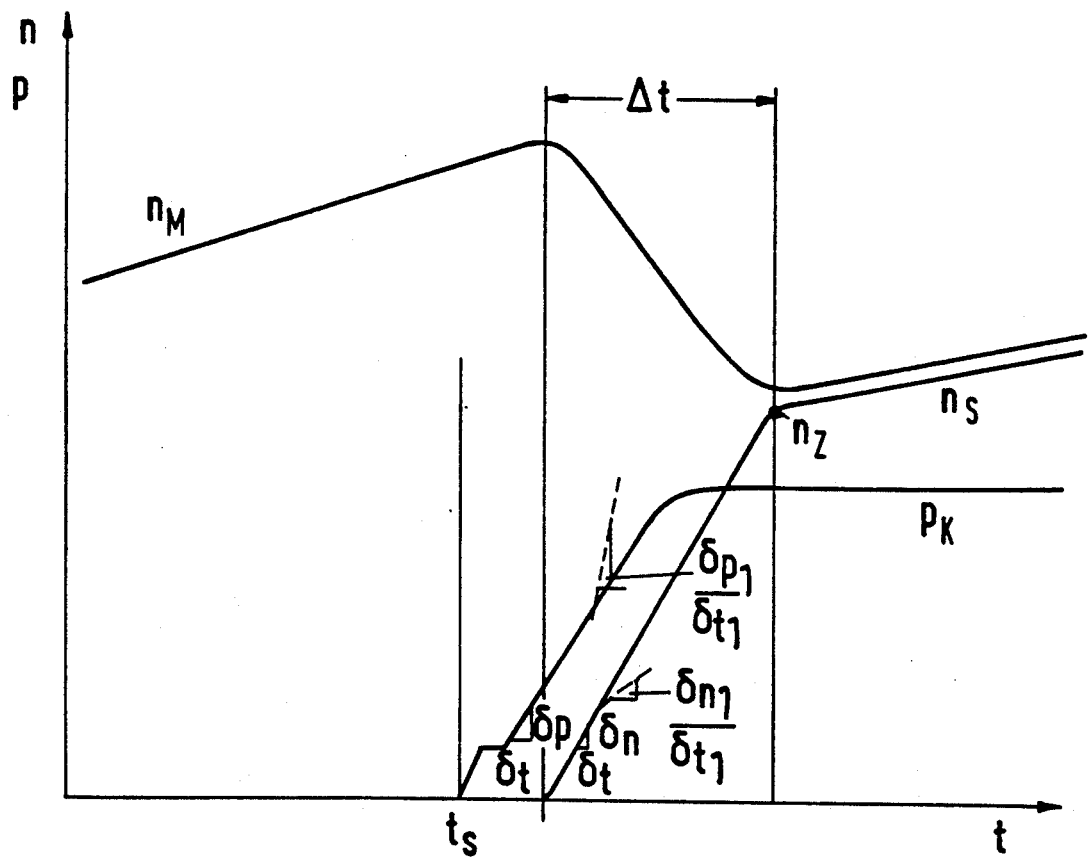
FIG. 3 is a graphical representation showing a controlled and adaptive upshift from second gear to third gear.

As an example of a controlled and adaptive upshift operation, FIG. 3 shows an upshift from second to third gear. The following additional reference symbols are used in FIG. 3:

p = pressure
$p_K$ = coupling pressure
$t_S$ = time of control command
$\delta n/\delta t$ = speed gradient
$\delta p/\delta t$ = pressure increase during shifting
$\Delta t$ = duration of shifting sequence The sequence for control of the time at which shifting operations take place on an upshift from second to third gear is as follows. At the time $t_S$, a control command goes to the electrohydraulic valve for the third gear coupling. The speed gradient $\delta n/\delta t$ of the sun gear speed is then continuously evaluated. So long as the second transmission gear predominates mechanically with respect to the planetary gear arrangement, the sun gear speed $n_S$ will be zero. As soon as the third gear coupling is able to take over the transmission of moment through the transmission, the sun gear speed $n_S$ increases. The speed gradient $\delta n/\delta t$ is computed in the control device at discrete intervals of time. This computed value is compared with a load-dependent ideal differential value. If the determined gradient is too small, the shift pressure rise $\delta p/\delta t$ is increased in the third gear coupling. On the other hand, if the speed gradient is too high, the coupling pressure is reduced. When the sun gear speed $n_S$ attains the target speed $n_Z$, i.e., the transmission input speed at the end of shifting, the shift operation is mechanically completed.

Analogously, this control sequence works exactly the same way in shift from first gear to second gear and from third gear to fourth gear, but in those cases the sun gear speed $n_S$ decreases to $n_S=0$.

I claim:

1. A method for controlling shifting parameters in an automatic transmission which includes a planetary gear arrangement having a sum gear, planet gears and a ring gear in which the mechanical linkage of any two of the three planetary gear components represents a mechanical gear ratio and wherein during a shifting operation the sum gear speed is decreased to zero or increased from zero comprising the steps of measured speed and variation in speed of the sum gear and using these measured values to provide an exact determination of at least one of a transmission coupling point, a duration of shifting time, and a control of engine operation, wherein for exact determination of the coupling point, commencement of shifting is determined by measuring the speed variation of the sum gear upon commencement of a transition from an old to a new transmission gear and comparing the measured sun gear speed values with a predetermined speed difference value characterizing the commencement of shifting.

2. A method according to claim 1 including retarding engine ignition time to reduce engine power upon the commencement of shifting as determined by a variation in speed of the sun gear.

3. A method according to claim 2 wherein the reduced engine power is maintained during shifting.

4. A method according to claim 2 including measuring increase in speed of the sum gear and measuring transmission drive speed and determining from these values a new target speed for the sun gear at the end of shifting and changing the ignition time smoothly to the new value corresponding to the operating point in a characteristic diagram of the engine when the sum gear speed differs from this target speed by a predetermined differential value during transmission gear shifts in which the sun gear speed is accelerated from zero to the transmission drive speed.

5. A method according to claim 1 including measuring the speed of the sun gear during shifting, determining the sun gear speed gradient at discrete intervals of time and comparing the sun gear speed gradient with a predetermined load-dependent ideal differential value, and varying the hydraulic shifting pressure to control shifting.

* * * * *

UNITED STATES PATENT AND TRADEMARK OFFICE
CERTIFICATE OF CORRECTION

PATENT NO. : 5,261,296
DATED : November 16, 1993
INVENTOR(S) : Norbert Ramm

It is certified that error appears in the above-identified patent and that said Letters Patent is hereby corrected as shown below:

<u>Column 1, line 10</u>, "planet gear" should read --planet gears--;

<u>Column 3, line 32</u>, "to great" should read --too great--;

<u>Column 4, line 22</u>, "from" should read --from Fig. 1--;

<u>Column 4, line 46</u>, "time $n_z$" should read --time Z--;

<u>Column 4, line 50</u>, "speed $n_x$" should read --speed $n_s$--;

<u>Column 5, between lines 22 and 23</u>, add --Although the invention has been described herein with reference to specific embodiments, many modifications and variations therein will readily occur to those skilled in the art. Accordingly, all such variations and modifications are included within the intended scope of the invention--;

<u>Column 5, lines 29-31</u>, delete "and wherein during a shifting operation the sun gear speed is decreased to zero or increased from zero"

<u>Column 5, line 31</u>, "measured" should read --measuring--;

<u>Column 5, line 32</u>, "the sun gear" should read --a sun gear whose speed increases from zero or decreases to zero during a shifting operation,--;

UNITED STATES PATENT AND TRADEMARK OFFICE
CERTIFICATE OF CORRECTION

PATENT NO. : 5,261,296
DATED : November 16, 1993
INVENTOR(S) : Norbert Ramm

It is certified that error appears in the above-indentified patent and that said Letters Patent is hereby corrected as shown below:

Column 6, line 2, "point," should read --point, a--.

Signed and Sealed this

Fourteenth Day of June, 1994

BRUCE LEHMAN

*Attest:*

*Attesting Officer*     *Commissioner of Patents and Trademarks*